(No Model.) 2 Sheets—Sheet 1.
H. C. BOSLEY & J. H. ORGAN.
COMBINED COTTON CHOPPER AND CULTIVATOR.
No. 513,074. Patented Jan. 23, 1894.
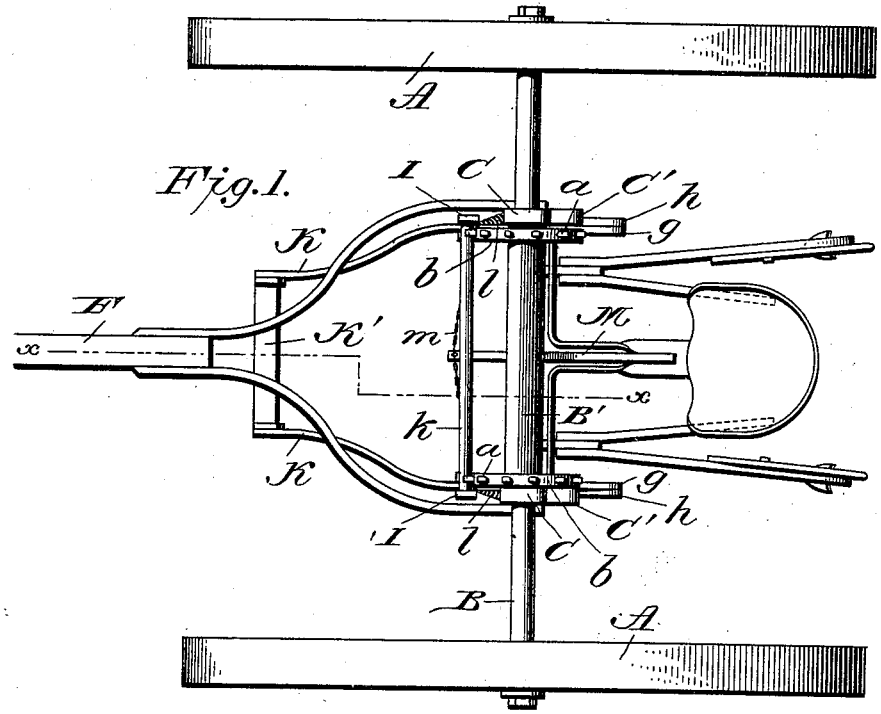

(No Model.) 2 Sheets—Sheet 2.
H. C. BOSLEY & J. H. ORGAN.
COMBINED COTTON CHOPPER AND CULTIVATOR.
No. 513,074. Patented Jan. 23, 1894.
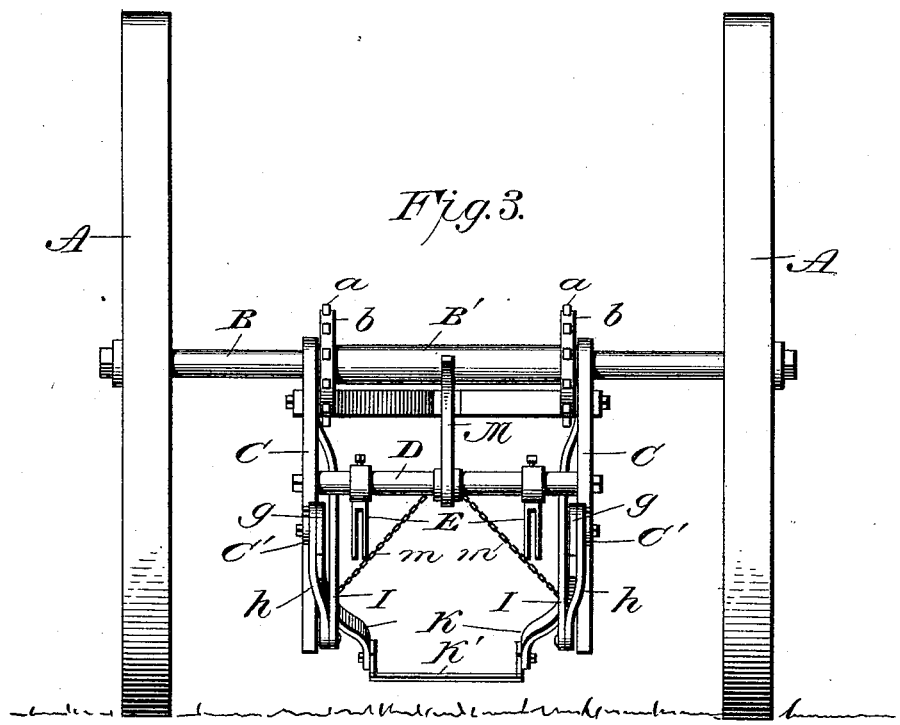
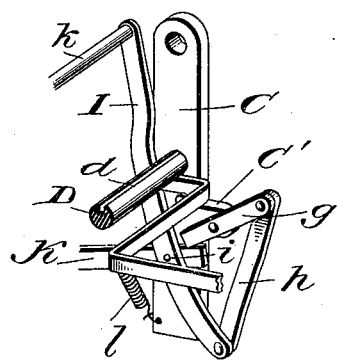
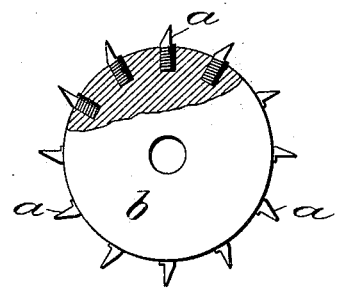
Henry C. Bosley.
—and—
Joseph H. Organ
Inventors
Witnesses
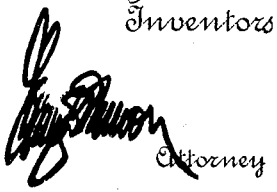

UNITED STATES PATENT OFFICE.

HENRY C. BOSLEY AND JOSEPH H. ORGAN, OF TIOGA, TEXAS.

COMBINED COTTON CHOPPER AND CULTIVATOR.

SPECIFICATION forming part of Letters Patent No. 513,074, dated January 23, 1894.

Application filed March 10, 1893. Serial No. 465,468. (No model.)

*To all whom it may concern:*

Be it known that we, HENRY C. BOSLEY and JOSEPH H. ORGAN, citizens of the United States of America, residing at Tioga, in the county of Grayson and State of Texas, have invented certain new and useful Improvements in Cultivators; and we do hereby declare the following to be a full, clear and exact description of the invention, such as will enable others skilled in the art to which it appertains to make and use the same, reference being had to the accompanying drawings, and to letters or figures of reference marked thereon, which form a part of this specification.

This invention relates to improvements in a combined cotton chopper and cultivator; and it consists in providing the main axle with spur-wheels and with depending supports to which are attached the beams of the cultivator shovels and a cutting blade which extends in front of the machine and is adapted to be vibrated by the spur-wheels as the machine moves over the ground, thereby providing means for chopping cotton or other stalks, as will be hereinafter fully set forth and specifically pointed out in the claims.

In the accompanying drawings, forming part of this specification, Figure 1 is a plan view. Fig. 2 is a sectional view through the line $x-x$ of Fig. 1. Fig. 3 is a rear elevation with the cultivator shovels and driver's seat detached. Fig. 4 is a detail perspective view. Fig. 5 is a detail view of one of the sprocket-wheels, partly in section.

A A designate the supporting wheels, one of which is loosely mounted on the axle B so as to prevent one of the wheels dragging when the machine is being turned. Upon the axle is rigidly attached a sleeve B' to the ends of which are secured the spur-wheels, consisting of disks $b$ having projecting teeth $a$, one side of each tooth being beveled as shown in Fig. 5. On the outer side of the spur-wheels and upon the axle are hung depending supports C C, which are rigidly connected to each other by a transverse bar D, which is provided with a longitudinal groove $d$, and upon this bar are rigidly secured hangers E E, the lower ends of which are bifurcated to embrace the ends of the beams of the cultivators which are secured in place by a pivot-pin, as shown. The hangers are laterally adjustable upon the bar D and are provided with set-screws which enter the groove $d$ and prevent said hangers turning upon the bar.

F designates the draft-tongue, which is connected to the supports C C below the axle and is of any approved construction.

The depending supports C C are provided with rearwardly projecting portions C' to which are pivoted short levers $g$ to the rear ends of which are pivoted links $h$ which connect said levers to a pair of long levers I. The levers I I are pivoted to the depending supports by pins $i$, and the upper ends of these levers are connected by a cross-bar $k$, which cross-bar is held normally in engagement with the spur-wheels which operate upon the same to oscillate the levers. The cross-bar is loosely mounted in the ends of the levers so as to serve as a roller. The pins $i$ also pivot to the depending supports forwardly extending arms K K which are connected at their forward ends by a blade K', said blade being adapted to operate upon the stalks as hereinafter set forth. The forward ends of the arms are held normally in a lowered position by helical springs $l\ l$, which are connected to the lower ends of the depending supports and to the arms. The arms K are also provided with flexible connections $m$ which extend to a lever M mounted on the cross-bar D, the rear end of the lever being bent so as to extend where it can be within easy reach from the driver's seat. The seat is supported by a flat spring bar which is split and the members so formed bent to extend to the depending supports C C, where they are secured by being passed beneath the cross-bar D and above a stud or pin located out of line with the cross-bar, which permits the ready removal of the seat when desired.

In operation, when the cultivator and cotton chopper is drawn across the field the axle will be turned and the spur-wheels mounted thereon oscillated, which movement will operate the cross-bar $k$, and cause the levers I I to oscillate on their pivots, and as the links $h\ h$ connect the levers I with the levers $g$ the latter will be rocked upon their pivots and bearing upon the rear ends of the arms K will impart a similar movement thereto, which movement will cause the blade K' to be rapidly raised and lowered, so that as the machine moves across the field the blade will cut the stalks and thoroughly chop the surface of the ground in front of the cultivator blades which follow in the path of the same.

The machine is so constructed that it may be used as a hoe without the cultivator blades, or vice versa.

Having thus described our invention, what we claim as new, and desire to secure by Letters Patent, is—

1. In a cotton chopper, the combination, of an axle carrying spur-wheels and depending supports, levers pivoted to the supports, and forwardly projecting arms pivoted to the supports and carrying a cutting blade, the arms being drawn in one direction by springs and the levers arranged so as to be oscillated by the spur-wheels and transmit such motion to the arms, substantially as shown, and for the purpose set forth.

2. In a cotton chopper, the combination, of an axle provided with spur-wheels and depending supports C C which are connected to each other, levers I and $g$ pivoted to said supports, links connecting the levers, and arms also pivoted to the supports said arms carrying a transverse blade or cutter, the levers I being placed in a position to be oscillated by the spur-wheels mounted on the axle and in turn, through the medium of the link, oscillate the arms which carry the cutter substantially as shown, and for the purpose set forth.

3. In a cotton chopper, the combination, of an axle having spur-wheels mounted thereon, supports depending from the axle and connected to each other by a cross-bar, pairs of levers pivoted to the supports, one pair of the levers being adapted to engage with the spur-wheels, links connecting the lower ends of the longer levers with short levers, arms K K carrying a cutter, said arms being pivoted to the supports, the ends of the arms rear of their pivots engaging with the levers, and springs for moving the arms in an opposite direction from the levers, substantially as shown, and for the purpose set forth.

4. In a cotton chopper, the combination, of an axle having supporting wheels and spur-wheels, attached to the axle for imparting an oscillating motion to levers and therefrom to cutters depending hangers C C, levers I I and $g\ g$ pivoted to the hangers and connected by links $h$, arms K K having rearwardly extending ends which are adapted to engage with the levers $g\ g$, said arms carrying cutters K', and springs connecting the arms with the hangers, and a flexible connection attached to the arms and connected to a lever whereby the arms can be elevated so that their rear ends can be held out of engagement with the forward ends of the levers $g\ g$, substantially as shown.

5. A cotton chopper and cultivator, comprising an axle having supporting wheels and spur-wheels, depending supports C C and connecting bar D, levers I and $g$ pivoted to the supports and connected to each other by links $h$, a cross-bar or roller carried by the levers I for engagement with the spur-wheels, arms K K pivoted to the depending supports and carrying a cutting blade, the rear ends of said arms being held in engagement with the levers $g$, and cultivators adapted to follow in the path of the blade carried by the arms K, substantially as shown, and for the purpose set forth.

In testimony whereof we affix our signatures in presence of two witnesses.

HENRY C. BOSLEY.
JOSEPH H. ORGAN

Witnesses:
T. W. BLANKENCHIP,
E. B. BATES.